(12) United States Patent
Khan et al.

(10) Patent No.: US 8,428,638 B2
(45) Date of Patent: Apr. 23, 2013

(54) BASE STATION CONTROL

(75) Inventors: Mohammad Ather Khan, Peatmoor (GB); Hai Zhou, Swindon (GB); Andrew Zaporozhets, Chippenham (GB)

(73) Assignee: Alcatel Lucent, Paris (FR)

( * ) Notice: Subject to any disclaimer, the term of this patent is extended or adjusted under 35 U.S.C. 154(b) by 738 days.

(21) Appl. No.: 12/431,124

(22) Filed: Apr. 28, 2009

(65) Prior Publication Data
US 2009/0280854 A1 Nov. 12, 2009

(30) Foreign Application Priority Data
Apr. 29, 2008 (EP) .................................. 08360010

(51) Int. Cl.
*H04B 7/00* (2006.01)
(52) U.S. Cl.
USPC ........................................ 455/522; 455/453
(58) Field of Classification Search .................. 455/453, 455/522
See application file for complete search history.

(56) References Cited

U.S. PATENT DOCUMENTS

| | | | |
|---|---|---|---|
| 5,548,812 A | 8/1996 | Padovani et al. | |
| 6,546,058 B1 | 4/2003 | Gilhousen et al. | |
| 6,584,330 B1 * | 6/2003 | Ruuska | 455/574 |
| 6,654,608 B1 * | 11/2003 | Monell et al. | 455/436 |
| 7,697,469 B2 * | 4/2010 | Wu et al. | 370/328 |
| 7,756,548 B2 * | 7/2010 | Laroia et al. | 455/561 |
| 2002/0155854 A1 * | 10/2002 | Vanghi | 455/522 |

FOREIGN PATENT DOCUMENTS

| | | |
|---|---|---|
| GB | 2 362 785 A | 11/2001 |
| WO | WO 00/65747 A1 | 11/2000 |
| WO | WO 2008/122824 A2 | 10/2008 |

OTHER PUBLICATIONS

M. Mouly, M.-B. Pautet: "The GSM System for Mobile Communication," Palaiseau, France, XP002491585, pp. 414-429, 1992.
European Search Report.

* cited by examiner

*Primary Examiner* — James H Cho
(74) *Attorney, Agent, or Firm* — Fay Sharpe LLP

(57) ABSTRACT

A method of controlling a base station, a network controller, a base station, a telecommunications network and a computer program product are disclosed. A method of controlling a base station (140; 150; 160) in a mobile telecommunications network (220) comprises the steps of: (i) determining whether a base station within the mobile telecommunications network is not supporting user equipment (110; 120; 130) and, if so, then (ii) signalling the base station to reduce its transmission power. An assessment is made as to whether a base station is currently supporting user equipment. If a base station is currently supporting user equipment, then that base station is unlikely to be a candidate to have its power reduced since support to that user equipment needs to be maintained. However, if a base station is not supporting user equipment, then that base station would appear to be a likely candidate for transmission power reduction, thereby saving power in the network at those locations where it is possible to do so.

12 Claims, 6 Drawing Sheets

BASE STATION CONTROL

FIELD OF THE INVENTION

The present invention relates to a method of controlling a base station, a network controller, a base station, a telecommunications network and a computer program product.

BACKGROUND OF THE INVENTION

In many mobile telecommunications systems, such as, for example, in a third generation (3G) evolved universal terrestrial radio access network (E-UTRAN) telecommunications system, a number of base stations (E-UTRAN node Bs—eNBs) are arranged to communicate with a number of user equipment (UEs). A number of channels are provided between the base stations and user equipment to support this communication. Each base station is geographically separated from the others in order to provide communications coverage over a wide area. Also, each base station is typically arranged to support a number of 'sectors' extending outwards from the base station location.

User equipment may establish a communications link with a base station when within its associated sector. As the user equipment roams throughout the network it will eventually leave its current sector and enter a new sector. When this happens, the current base station will need to 'handover' the user equipment to a base station associated with that new sector. To assist in this process, the user equipment typically continually attempts to identify further base stations with which it may establish a communications link. Likewise, the network itself may derive information from the user equipment and indicate to the user equipment details of the most likely base station to which a handover may occur. The sectors generally overlap somewhat geographically to enable communication with an existing base station to be retained until communication with a new base station can be established and a handover can occur. It can be seen that this enables user equipment to roam throughout the network, with the user equipment being handed over from base station to base station.

It will be appreciated that this arrangement helps to ensure that user equipment can reliably establish a connection and enables the user equipment to room through the network. However, a problem with the arrangement described above is that the network consumes large amounts of power.

It is desired to provide an improved arrangement which consumes less power.

SUMMARY OF THE INVENTION

According to a first aspect of the present invention there is provided a method of controlling a base station in a mobile telecommunications network, the method comprising the steps of: (i) determining whether a base station within the mobile telecommunications network is not supporting user equipment and, if so, then (ii) signalling the base station to reduce its transmission power.

The first aspect recognises that there can be comparatively long periods of time during which no user equipment needs supporting by a base station such as would occur, for example, at night in rural areas. These base stations may be powered for long periods of time unnecessarily. Whilst techniques exist to try to help ameliorate this problem, none of the existing techniques have proved to be satisfactory since they generally make predictions about network usage and it is often the case that these assumptions are wrong. This then either leads to an under capacity in the network, which causes resultant user problems, or maintains more capacity in the network than is necessary, which unnecessarily wastes power.

Accordingly, an assessment is made as to whether a base station is currently supporting user equipment. If a base station is currently supporting user equipment, then that base station is unlikely to be a candidate to have its power reduced since support to that user equipment needs to be maintained. However, if a base station is not supporting user equipment, then that base station would appear to be a likely candidate for transmission power reduction, thereby saving power in the network at those locations where it is possible to do so. Accordingly, it can be seen that power transmission across the network can be dynamically adapted to suit current operating conditions, thereby enabling enhanced power reductions to be achieved.

In one embodiment, the step (i) comprises: determining whether at least one of a plurality of base stations within the mobile telecommunications network is not supporting user equipment and is not indicated within a neighbour list associated with one of the plurality of base stations which is supporting user equipment and if so, then the step (ii) comprises: signalling the at least one of a plurality of base stations to reduce its transmission power. Accordingly, when it is established that a particular base station is not currently supporting user equipment, neighbour lists of those base stations currently supporting user equipment are checked. Assuming the base station also does not appear in those neighbour lists then the base station is signalled to reduce its power. It will be appreciated that this approach helps to ensure that power reductions can be achieved without compromising service levels since those base stations to which the user equipment may need to handover remain powered.

In one embodiment, the step (i) comprises: determining whether at least one of a plurality of base stations within the mobile telecommunications network is not supporting user equipment but is indicated within a neighbour list associated with one of the plurality of base stations which is supporting user equipment, and whether the at least one of a plurality of base stations is predicted based on historical user equipment location information to be unlikely to be required to support the user equipment and if so, then the step (ii) comprises: signalling the at least one of a plurality of base stations to reduce its transmission power. Accordingly, even when a base station is not currently supporting user equipment but is indicated on a neighbour list of base stations currently supporting user equipment, it may still be possible to reduce the power of this base station if it is likely that the base station will not be required to support the user equipment following a handover. This determination can be made by using information on the previous locations of the user equipment and then making a prediction on where the user equipment is most likely to move to next. In this way, even those base stations which appear in a neighbour list may still have their power reduced if it is unlikely that they will be required to support the user equipment, thereby saving further power.

In one embodiment, the step (i) comprises: determining whether the base station within the mobile telecommunications network is designated as being required to maintain a predetermined transmission power level in order to provide minimal coverage for user equipment and, if so, then preventing reduction in transmission power of the base station below the predetermined transmission power level. In order to ensure that it is possible to at least obtain a connection for, for example, an emergency call, predetermined base stations throughout the network may be prevented from having their power reduced below a particular level to ensure such coverage. Accordingly, when such a base station is identified as being a candidate for power reduction, reduction in transmission power of that base station is prevented if this would cause the transmission power to drop below that particular level. It will be appreciated that this prevention could occur in the device which signals the base station to reduce its transmission power and/or the prevention could occur in the base station by the base station itself refusing to execute such instructions.

In one embodiment, the step (i) comprises: determining whether a base station within the mobile telecommunications network is not supporting user equipment within a sector associated with that base station and, if so, then the step (ii) comprises: signalling the base station to reduce transmission power within the sector. It will be appreciated that a base station may be associated with a single or more than one sectors.

In one embodiment, the step (ii) comprises reducing transmission power by switching to a reduced transmission power state which reduces user equipment coverage provided by the base station. Accordingly, the base station may be signalled to reduce its power transmission to a particular predetermined level in order to reduce power consumption whilst still maintaining a required level of coverage.

In one embodiment, the step (ii) comprises reducing power transmission by switching to an inactive state which provides no user equipment coverage by the base station. Accordingly, where no user coverage is required, the base station may be switched to a completely inactive state in which no communication with user equipment occurs. Powering down a base station would generally only affect its transmission output, normal communications with the rest of the telecommunications network will generally be maintained.

In one embodiment, the step (i) comprises determining whether the base station within the mobile telecommunications network is not supporting user equipment by determining whether no indication has been received from either user equipment or the base station for a predetermined period which indicates that the base station is supporting user equipment. In order to prevent fluctuations in transmission power of the base stations it may only be considered that the base station is not supporting user equipment when the base station has not supported a user equipment for a particular period of time and/or a user equipment has not reported that it is being supported by that base station for a particular period of time.

According to a second aspect of the present invention there is provided a network controller for controlling base stations in a mobile telecommunications network, the network controller comprising: determination logic operable to determine whether a base station within the mobile telecommunications network is not supporting user equipment; and transmission power control logic operable, in response to the logic indicating that the base station is not supporting user equipment, to signal the base station to reduce its transmission power.

In one embodiment, the determining logic is operable to determine whether at least one of a plurality of base stations within the mobile telecommunications network is not supporting user equipment and is not indicated within a neighbour list associated with one of the plurality of base stations which is supporting user equipment and the transmission power control logic operable, in response to the determining logic indicating that the base station is not supporting user equipment and is not indicated within a neighbour list associated with one of the plurality of base stations which is supporting user equipment to signal the at least one of a plurality of base stations to reduce its transmission power.

In one embodiment, the determining logic is operable to determine whether at least one of a plurality of base stations within the mobile telecommunications network is not supporting user equipment but is indicated within a neighbour list associated with one of the plurality of base stations which is supporting user equipment, and is operable to determine whether the at least one of a plurality of base stations is predicted based on historical user equipment location information to be unlikely to be required to support the user equipment and the transmission power control logic is operable, in response to the determining logic indicating that the at least one of a plurality of base stations within the mobile telecommunications network is not supporting user equipment but is indicated within a neighbour list associated with one of the plurality of base stations which is supporting user equipment, and that the at least one of a plurality of base stations is predicted based on historical user equipment location information to be unlikely to be required, to support the user equipment to signal the at least one of a plurality of base stations to reduce its transmission power.

In one embodiment, the determining logic is operable to determine whether the base station within the mobile telecommunications network is designated as being required to maintain a predetermined transmission power level in order to provide minimal coverage for user equipment and, if so, is operable to prevent reduction in transmission power of the base station below the predetermined transmission power level.

In one embodiment, the determining logic is operable to determine whether a base station within the mobile telecommunications network is not supporting user equipment within a sector associated with that base station and, the transmission power control logic is operable, in response to the determining logic indicating that the mobile telecommunications network is not supporting user equipment within a sector associated with that base station, to signal the base station to reduce transmission power within the sector.

In one embodiment, the transmission power control logic is operable to reduce transmission power by switching to a reduced transmission power state which reduces user equipment coverage provided by the base station.

In one embodiment, the transmission power control logic is operable to reduce transmission power by switching to an inactive state which provides no user equipment coverage by the base station.

In one embodiment, the determining logic is operable to determine whether the base station within the mobile telecommunications network is not supporting user equipment by determining whether no indication has been received from either user equipment or the base station for a predetermined period which indicates that the base station is supporting user equipment.

According to a third aspect of the present invention there is provided a base station for a mobile telecommunications network, the base station comprising: usage logic operable to indicate to a network controller whether user equipment is being supported; and transmission power logic operable, in response to a signal from the network controller to the base station indicating that a reduction in its transmission power is required, to cause the base station to reduce its transmission power.

In one embodiment, the transmission power logic is operable in response to the signal to the base station to reduce its transmission power to cause the base station to reduce its power consumption when the usage logic indicates that user equipment is not being supported.

In one embodiment, the base station is designated as being required to maintain a predetermined transmission power level in order to provide minimal coverage for user equipment and the transmission power logic is operable in response to the signal to the base station to reduce its transmission power to prevent the base station from reducing its power consumption below the predetermined transmission power level.

According to a fourth aspect of the present invention there is provided a telecommunications network comprising at least one network controller according to the second aspect and at least one base station according to the third aspect.

According to a fifth aspect of the present invention there is provided a computer program product operable, when executed on a computer, to perform the method steps of the first aspect.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will be described further, with reference to the accompanying drawings, in which.

DESCRIPTION OF THE EMBODIMENTS

Figure 1:
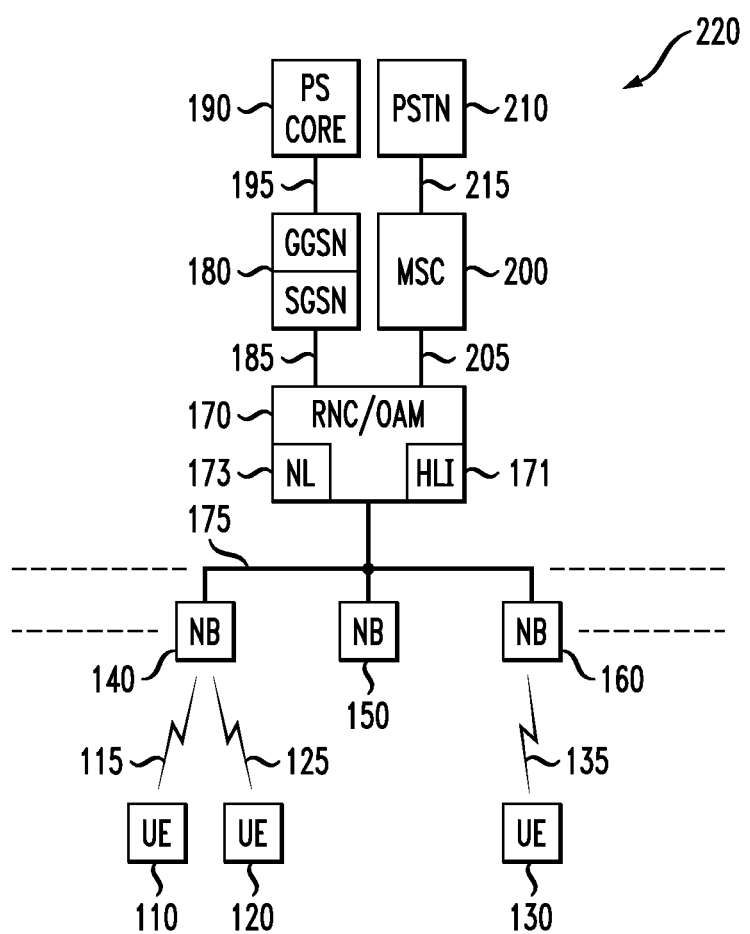
FIG. 1 illustrates a mobile telecommunications network according to one embodiment.
Figure 2:
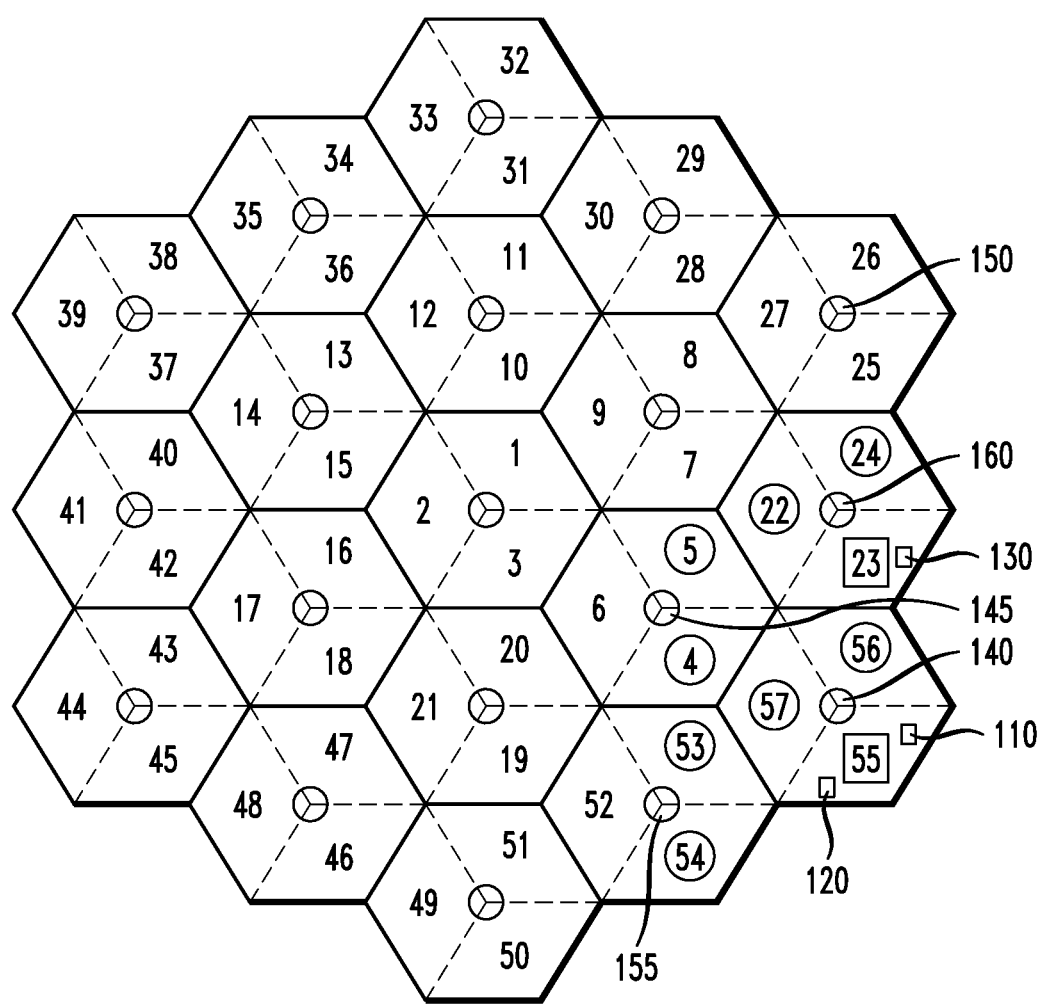
FIGS. 2 to 5 show an example deployment and operation of units of the telecommunications network of FIG. 1.

FIG. 1 shows units of a telecommunications network 220 according to one embodiment. User equipment 110, 120, 130 roam through the telecommunications network 220. A number of base stations 140, 150, 160 are provided which are distributed geographically in order to provide a wide area of coverage to user equipment. Each base station 140, 150, 160 may support one or more sectors, as will be described in more detail below. When user equipment 110, 120, 130 is within a sector supported by one of the base stations 140, 150, 160 then communications may be established between the user equipment and the associated base station over an associated radio link. For example, user equipment 110 establishes a radio link 115 with the base station 140. Likewise, user equipment 120 establishes a radio link 125 also with the base station 140. User equipment 130 may be at a geographically different location and establishes a radio link 135 with the base station 160. Of course, it will be appreciated that FIG. 1 illustrates a small subset of the total number of user equipment and base stations that may be present in a typical telecommunications network.

The telecommunications network 220 is managed by a network controller 170 which includes a radio network controller (RNC) and an operations administration manager (OAM). The network controller 170 controls the operation of the telecommunications network 220 by communicating with the base stations 140, 150, 160 over the communications link 175. The network controller 170 also communicates with the user equipment 110, 120, 130 via their respective radio links in order to efficiently manage the telecommunications network 220.

The network controller 170 maintains a neighbour list 173 which includes information about the geographical relationship between sectors supported by base stations, as will also be described in more detail below. In addition, the network controller 170 maintains historic location information 171 which provides information on the previous locations of the user equipment within the telecommunications network 220 to enable future predictions on user equipment location to be made. The network controller 170 is operable to route traffic via circuit switched and pocket switched networks. Hence, a mobile switching centre 200 is provided with which the network controller 170 may communicate over the transmission path 205. The mobile switching centre 200 then communicates over the path 215 with a circuit switched network such as a public switched telephone network (PSTN) 210. Likewise, the network controller 170 communicates with Serving General Packet Radio Service Support Nodes (SGSNs) and a Gateway General Packet Radio Support Node (GGSN) 180 over a communications path 185. The GGSN then communicates over the communications link 195 with a packet switched core 190 such as, for example, the Internet.

FIGS. 2 to 5 illustrate the operation of the telecommunications network 220 in more detail. An example geographical layout of the telecommunications network 220 is shown in which neighbouring base stations are included in addition to those shown in FIG. 1. As can be seen, each base station 140, 150, 160 supports three sectors; for example, base station 140 supports sectors 55, 56, 57. It will be appreciated that whilst each base station has been shown as supporting multiple sectors, each sector could equally be considered as being supported by a single base station; also, each base station may support more or less sectors. The user equipment 130 is located within the sector 23 supported by base station 160. The user equipment 110, 120 are both located within the sector 55 of the base station 140.

The base station 160 identifies the sector which is supporting the user equipment 130 as being sector 23. Likewise the bases station 140 identifies the sector 55 as being the sector supporting user equipment 110, 120. This information is provided to the network controller 170 which determines the neighbour list for sectors 23 and 55. In this example, the neighbour list for sector 23 includes sectors 24, 22, 5, 4, 57 and 56. Likewise, the neighbour list for sector 55 includes sectors 56, 57, 53 and 54. Accordingly, the network controller 170 may signal all base stations other than those supporting user equipment (or indicated within the neighbour lists of sectors supporting user equipment) to reduce their power. Assuming that no skeleton or emergency network coverage is required, this would then enable the transmission power in the sectors of all the base stations shown, with the exception of base stations 140, 160, 155, and 145 to be powered down. Powering down a base station would generally only affect its transmission output, normal communications with the rest of the telecommunications network 220 will generally be maintained. However, it will be appreciated that this can still provide significant power savings.

If it is required to maintain some degree of coverage throughout the telecommunications network 220, some of the sectors may be designated as those which must maintain a predetermined transmission power level and so the network controller 170 may, in those circumstances, choose not to power down those sectors below a predetermined threshold. Likewise, as a safety check, the associated base stations may be programmed not to respond to commands which require them to reduce their transmission power below that predetermined level. It will be appreciated that in code division multiple access (CDMA) telecommunications networks, extended geographical coverage con readily be obtained by taking advantage of the capacity to coverage curve, whereby when network traffic is particularly low the geographical area supported by a sector extends, even at an unchanged transmission power. In this way, even if user equipment is powered from an inactive state in one of the inactive sectors, a link may still be established and neighbouring sectors (which should eventually include the sector within which the user equipment is geographically located) will have its transmission power output restored.

Returning now to FIG. 2, base stations 160 and 140 maintain the transmission power of all three sectors at a level to support user equipment. However, base station 150 powers down all three sectors, 25, 26, and 27. Base station 145 maintains the transmission power of sectors 4 and 5 but powers down sector 6. Likewise, base station 155 maintains the transmission power of sectors 53 and 54 but powers down sector 52.

These power control signals are only transmitted when it has been judged by the network controller 170 that the base stations have not supported user equipment for a predetermined length of time, such as, for example, 30 minutes. This helps to prevent rapid power switching across the telecommunications network 220 and reduces power fluctuations. Also, the base stations will only respond to the power control signals if they agree with the network controller 170 that they hove not supported user equipment for that predetermined period of time.

Figure 3:
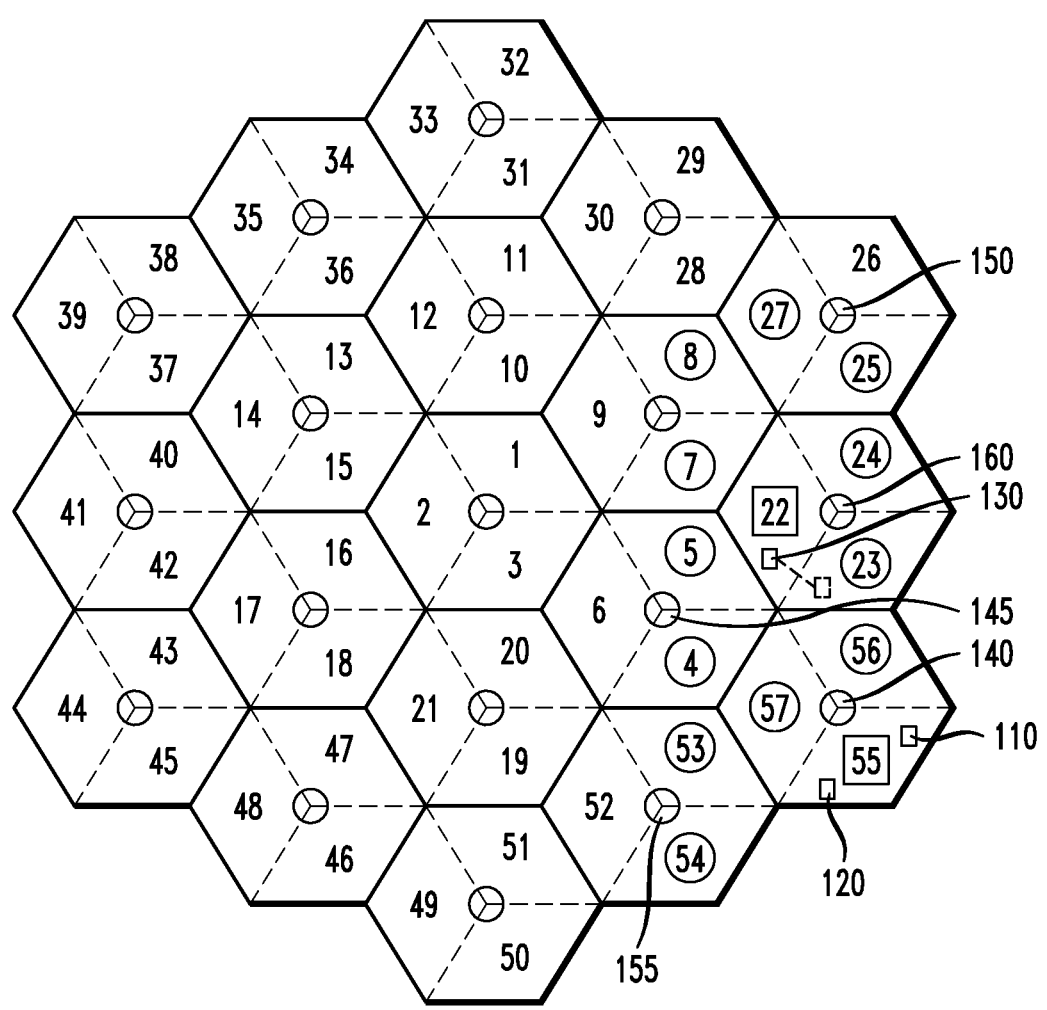

FIG. 3 shows the telecommunications network 220 at a later point in time. As can be seen, the user equipment 110, 120 have remained within sector 55. Accordingly, base station 140 maintains coverage within that sector, and the neighbouring sectors 56, 57, 53 and 54 also remain powered.

However, the user equipment 130 has now moved from sector 23 to sector 22. Accordingly, sector 22, together with all sectors in its neighbour list (sectors 23, 24, 25, 27, 8, 7, 5, 4, 57 and 56) are powered. Hence, it can be seen that base station 150 and the base station associated with sectors 8 and 7 have now been activated. Accordingly, it can be seen that user equipment 130 is able to move from one sector to a neighbouring sector without any loss of communication.

Figure 4:
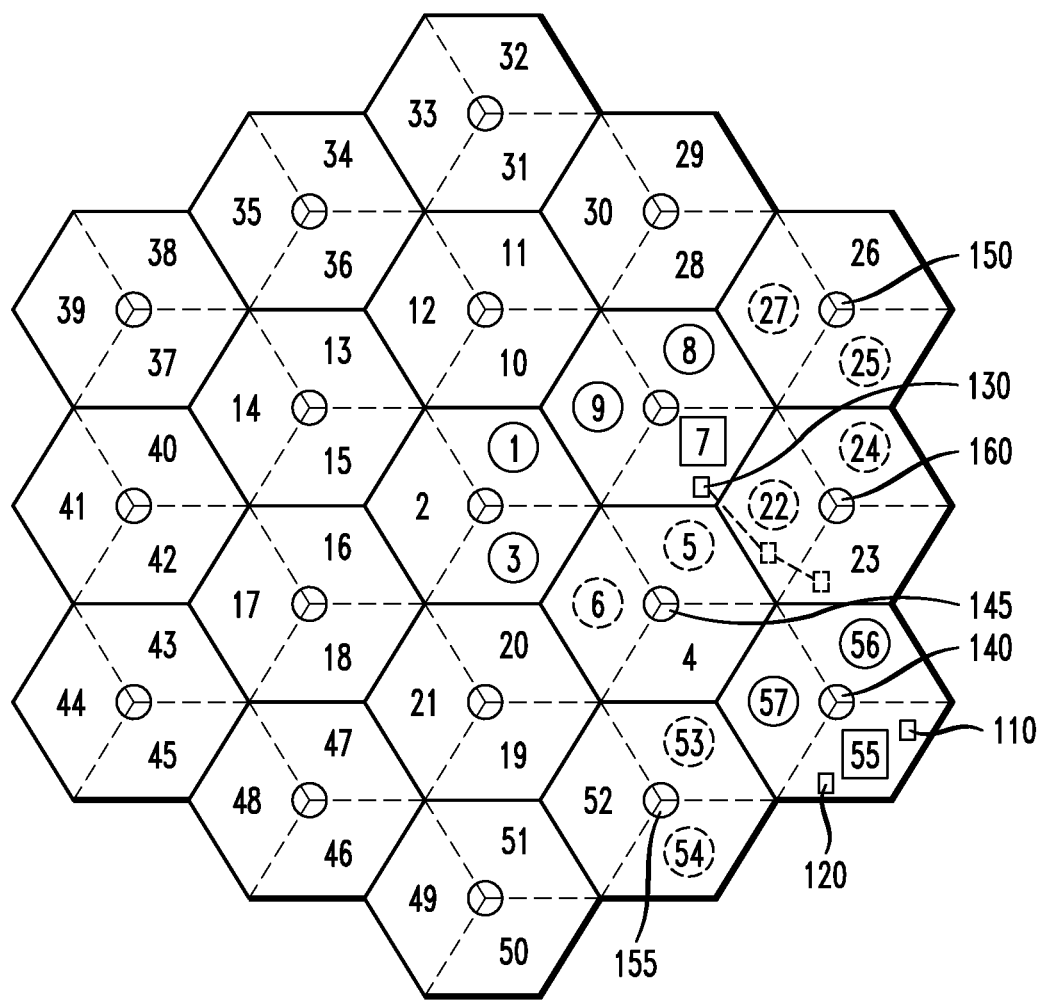

FIG. 4 illustrates the telecommunications network 220 after a further period of time. As can be seen, user equipment 110, 120 still remains within sector 55. Accordingly, based on historic location information 171, the network controller 170 decides that it is now unlikely that sectors 53 and 55 will be required to support the user equipment 110, 120. Signals may now be sent to base station 155 to either reduce transmission power output or to stop transmission output altogether.

The user equipment 130 has now moved from sector 22 to sector 7. Based on historic location information 171, the network controller 170 is able to determine that although sectors 6, 5, 22, 24, 25 and 27 are indicated within the neighbour list for sector 7, these sectors are unlikely to be required to support user equipment 130 and so these sectors may similarly have their transmission power reduced or stopped. Hence, only sector 7 and sectors 8, 9, 1 and 3 (which are indicated in the neighbour list of sector 7) remain fully powered.

Figure 5:
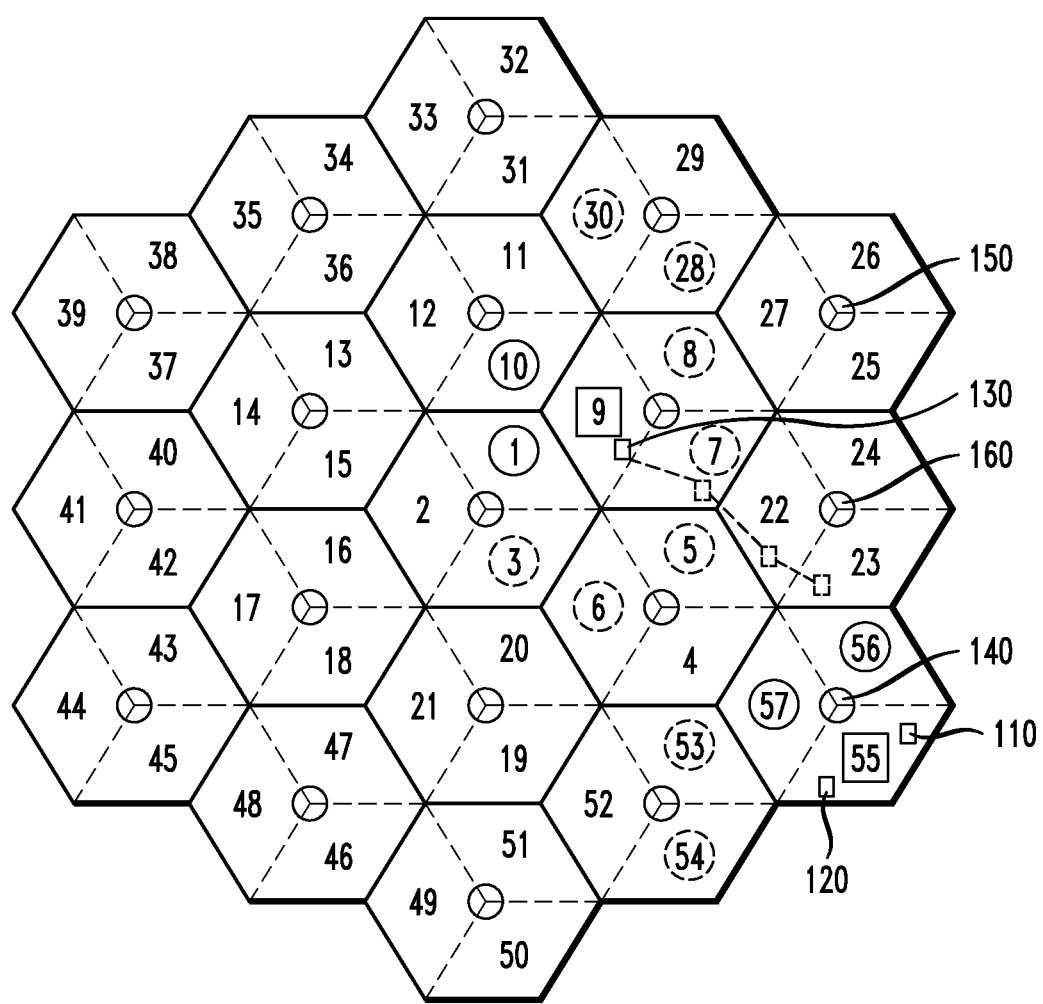

FIG. 5 illustrates the telecommunications network 220 after a yet further period of time. Once again, user equipment 110, 120 still remains within sector 55 and so no changes occur in this part of the network.

However, user equipment 130 has now moved to sector 9. As before, based on historic location information 171, the network controller 170 is able to determine that it is unlikely that sectors 3, 6, 5, 7, 8, 28 or 30 are going to be required to support the user equipment 130. Hence, only sector 9 and sectors 10 and 1 (which are indicated in the neighbour list of sector 9) remain powered.

Accordingly, it can be seen that those parts of the network which are not currently supporting user equipment and which are unlikely to be required to support user equipment may be powered down in order to reduce power consumption. By maintaining the rest of the network in a powered state, adequate network coverage can be maintained. Hence, the network is dynamically adaptable to changing conditions and is able to maximise power reduction.

Figure 6:
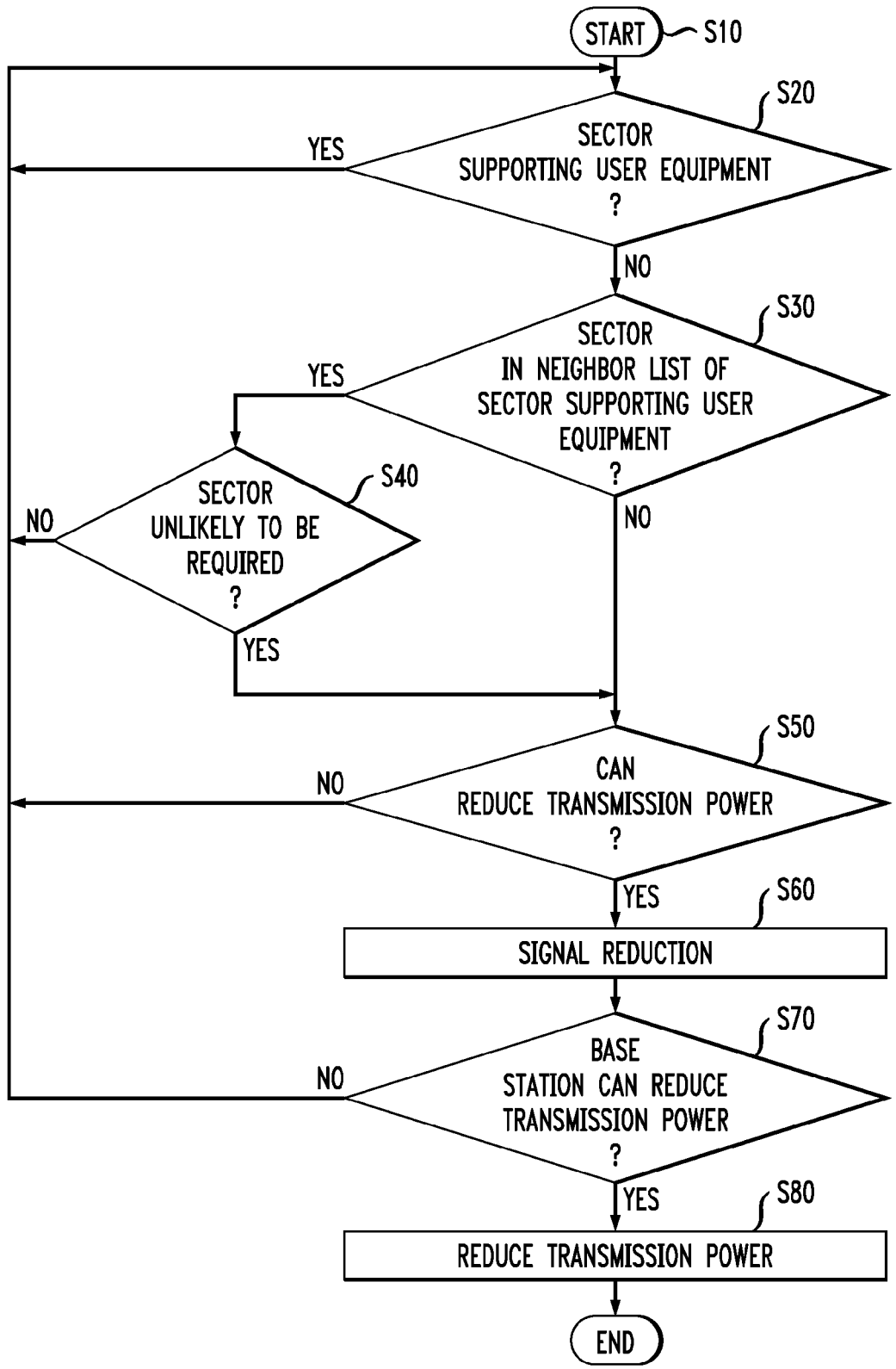
FIG. 6 is a flowchart illustrating the control of a base station according to one embodiment.

FIG. 6 is a flow diagram illustrating the main processing steps for controlling base stations to perform power reduction. Processing starts at step S10 and proceeds to step S20.

At step S20, a determination is made as to whether a sector is currently supporting user equipment. If the sector is currently supporting user equipment or has supported user equipment for less than a predetermined amount of time, then the base station associated with that sector should not have its power reduced and processing returns to step S10. If the sector is not supporting user equipment and has not supported user equipment for a predetermined period, then processing proceeds to step S30.

At step S30, it is determined whether the sector is in a neighbour list of a sector supporting user equipment. If it is in a neighbour list of a sector supporting user equipment, then processing proceeds to step S40 since it may still yet be possible to reduce power in that sector.

At step S40, a determination is made, based on the historical location information 171, whether despite being within a neighbour list the sector is still unlikely to be required to support user equipment. If the historical location information 171 indicates that the sector is likely to be required to support user equipment, then no power reduction occurs and processing returns to step S10. If the historical location information 171 indicates that the sector is unlikely to be required to support user equipment, then processing proceeds to step S50. Processing also proceeds from step S30 to step S50 if the sector is not within a neighbour list of a sector currently supporting user equipment.

At step S50, a determination is made by the network controller 170 as to whether it is possible to reduce the transmission power within that sector. If it is not possible to reduce transmission power within that sector (such as would occur if skeleton coverage is required and that sector has been identified as one which must remain powered at a predetermined level to achieve this), then no further power reduction is requested and processing returns to step S10. If, at step S50, it is determined that power may be reduced either because it is above that predetermined threshold or because that sector is not required for skeleton coverage, then processing proceeds to step S60.

At step S60, the network controller 170 signals a power reduction over the communications path 175 to the relevant base station. This signalling may occur over a control channel using private messages. Processing then proceeds to step S70.

At step S70, a check is made by the base station that it can reduce its transmission power. The base station may decide that it is not possible to reduce transmission power because either it is aware of user equipment attempting to connect or the predetermined period since a user equipment has been connected has not yet expired. Likewise, the base station may be independently programmed not to reduce its power below a particular level as a safety check in order to maintain skeleton coverage. If either of these conditions are satisfied, then no further power reduction occurs and processing returns to step S10. If it is determined that there is no reason not to reduce transmission power, then processing proceeds to step S80.

At step S80, the power reduction occurs.

Hence, it can be seen that an assessment is made whether a sector provided by a base station is currently supporting user equipment. If a sector is currently supporting user equipment, then that base station is unlikely to be a candidate to have its power reduced since support to that user equipment needs to be maintained. However, if a sector is not supporting user equipment, then that base station would appear to be a likely candidate for transmission power reduction, thereby saving power in the network at those locations where it is possible to do so. This enables power reduction to occur dynamically, based on the state of the network, without needing to make any predictions about network usage. Significant power reductions can be made by enabling base stations to reduce their transmission power during the comparatively long periods of time during when no user equipment needs supporting by a base station such as would occur, for example, at night in rural areas.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A method controlling a base station in a mobile telecommunications network, said method comprising:
   determining whether at least one of a plurality of base stations within said mobile telecommunications network is not supporting user equipment and is not indicated within a neighbor list associated with one of said plurality of base stations which is supporting user equipment, and if so, then
   signaling said at least one of the plurality of base stations to reduce its transmission power.

2. The method of claim 1, wherein said transmission power is reduced by switching to a reduced transmission power state which reduces user equipment coverage provided by said base station.

3. The method of claim 1, wherein said transmission power is reduced by switching to an inactive state which provides no user equipment coverage by said base station.

4. The method of claim 1, wherein said determining comprises determining whether said base station within said mobile telecommunications network is not supporting user equipment by determining whether no indication has been received from either user equipment or said base station for a predetermined period which indicates that said base station is supporting user equipment.

5. A method as set forth in claim 1 implemented via a non-transitory computer-readable storage medium containing a computer program operable, when executed on a computer, to perform the method.

6. A method of controlling a base station in a mobile telecommunications network, said method comprising:
   determining whether at least one of a plurality of base stations within said mobile telecommunications network is not supporting user equipment but Is indicated within a neighbor list associated with one of said plurality of base stations which is supporting user equipment, and whether said at least one of the plurality of base stations is predicted based on historical user equipment location information to be unlikely to be required to support said user equipment, and if so, then
   signaling said at least one of the plurality of base stations to reduce its transmission power.

7. A method of controlling a base station in a mobile, telecommunications network, said method comprising:
   determining whether a base station within said mobile telecommunications network is not supporting user equipment, and if so, then
   signaling said base station to reduce its transmission power, and
   determining whether said base station within said mobile telecommunications network is designated as being required to maintain a predetermined transmission power level in order to provide minimal coverage for user equipment, and if so, then preventing reduction in transmission power of said base station below said predetermined transmission power level.

8. A method of controlling a base station in a mobile telecommunications network, said method comprising:
   determining whether a base station within said mobile telecommunications network is not supporting user equipment within a sector associated with that base station, and if so, then
   signaling said base station to reduce transmission power within said sector.

9. A network controller for controlling base stations in a mobile telecommunications network, said network controller comprising:
   determination logic operable to determine whether at least one of a plurality of base stations within said mobile telecommunications network is not supporting user equipment and is not indicated within a neighbor list associated with one of the plurality of base stations which is supporting user equipment; and
   transmission power control logic operable, in response to said determination logic indicating that said at least one base station is not supporting user equipment, to signal said base station to reduce its transmission power.

10. A base station for a mobile telecommunications network, said base station comprising:
    usage logic operable to indicate to a network controller whether user equipment is being supported; and
    transmission power logic operable, in response to a signal from said network controller to said base station indicating that a reduction in its transmission power is requested, to cause said base station to reduce its transmission power;
    wherein said base station is designated as being required to maintain a predetermined transmission power level in order to provide minimal coverage for user equipment and said transmission power logic is operable in response to said signal to said base station to reduce its transmission power to prevent said base station from reducing its power consumption below said predetermined transmission power level.

11. The base station as claimed in claim 10, wherein said transmission power logic is operable in response to said signal to said base station to reduce its transmission power to cause said base station to reduce its power consumption when said usage logic indicates that user equipment is not being supported.

12. A telecommunications network comprising:
    at least one network controller comprising: determination logic operable to determine whether at least one of a plurality of base stations within said mobile telecommunications network is not supporting user equipment and is not indicated within a neighbor list associated with one of the plurality of base stations which is supporting user equipment; and transmission power control logic operable, in response to said determination logic indicating that said at least one base station is not supporting user equipment, to signal said at least one base station to reduce its transmission power; and the at least one base station comprising usage logic operable to: indicate to the at least one network controller whether user equipment is being supported; and transmission power logic operable, in response to a signal from said network controller to said base station indicating that a reduction in its transmission power is requested, to cause said base station to reduce its transmission power.

* * * * *